United States Patent
Oh et al.

(10) Patent No.: US 12,483,548 B2
(45) Date of Patent: Nov. 25, 2025

(54) SDP-BASED INFORMATION PROTECTION METHOD AND APPARATUS FOR IOT CLOUD SECURITY

(71) Applicant: Penta Security Inc., Seoul (KR)

(72) Inventors: Jin Hyeok Oh, Gwangmyeong-si (KR); Keon Yun, Seoul (KR); Sang Min Lee, Seoul (KR); Heesun Yun, Seoul (KR); Minchul Kim, Seoul (KR); Jun Yong Lee, Namyangju-si (KR); Sang Gyoo Sim, Seoul (KR); Tae Gyun Kim, Yongin-si (KR)

(73) Assignee: Penta Security Inc., Seoul (KR)

( * ) Notice: Subject to any disclaimer, the term of this patent is extended or adjusted under 35 U.S.C. 154(b) by 140 days.

(21) Appl. No.: 18/520,409

(22) Filed: Nov. 27, 2023

(65) Prior Publication Data

US 2025/0158978 A1 May 15, 2025

(30) Foreign Application Priority Data

Nov. 9, 2023 (KR) .................. 10-2023-0154859

(51) Int. Cl.
*H04L 9/40* (2022.01)
(52) U.S. Cl.
CPC ........ *H04L 63/083* (2013.01); *H04L 63/0428* (2013.01)
(58) Field of Classification Search
CPC ....... H04L 63/08; H04L 63/083; H04L 63/20; H04L 63/0428; H04L 9/0841
USPC .......................................................... 726/7
See application file for complete search history.

(56) References Cited

U.S. PATENT DOCUMENTS

| | | | |
|---|---|---|---|
| 7,769,880 B2 | 8/2010 | Paka et al. | |
| 9,055,107 B2* | 6/2015 | Medvinsky | G06F 21/33 |
| 9,154,485 B1* | 10/2015 | Fallows | H04L 63/08 |
| 10,129,239 B2* | 11/2018 | Bell | H04L 63/1433 |
| 10,958,664 B2* | 3/2021 | Jeon | H04L 9/3236 |
| 12,143,911 B2* | 11/2024 | Tschofenig | H04W 4/70 |
| 12,261,838 B2* | 3/2025 | Kumar | H04L 9/08 |
| 2018/0007172 A1 | 1/2018 | Wang et al. | |
| 2021/0136157 A1* | 5/2021 | Kauppila | H04L 67/141 |
| 2022/0377084 A1* | 11/2022 | Zhang | H04L 9/0841 |

(Continued)

FOREIGN PATENT DOCUMENTS

CN 112235235 A 1/2021

OTHER PUBLICATIONS

Office Action for KR 10-2023-0154859 by Korean Intellectual Property Office dated Jul. 2, 2024.

(Continued)

*Primary Examiner* — Amare F Tabor
(74) *Attorney, Agent, or Firm* — BROADVIEW IP LAW, PC (57) ABSTRACT

An information protection method based on software-defined perimeter (SDP) for Internet of Things (IoT) cloud security may comprise: receiving, at an SDP controller, an onboarding request message with an identity (ID) token from an SDP client acting as an initiating host, the onboarding request message comprising information requesting authentication of the SDP client and a handshake parameter specifying a handshake protocol for use in an SDP access process; and issuing, at the SDP controller, an SDP client credential corresponding to the handshake parameter.

16 Claims, 6 Drawing Sheets

(56) References Cited

U.S. PATENT DOCUMENTS

2023/0188505 A1\* 6/2023 Jensen .................. H04L 63/107
726/14

OTHER PUBLICATIONS

Bruni, Alessandro et al., "Formal Verification of Ephemeral Diffie-Hellman Over COSE (EDHOC)", Lecture Notes in Computer Science (LNCS), vol. 11322, doi: 10.1007/978-3-030-04762-7_2, Nov. 2018.

Garbis, Jason et al., "Software-Defined Perimeter (SDP) Specification v2.0", Cloud Security Alliance, Mar. 2022.

\* cited by examiner

SDP-BASED INFORMATION PROTECTION METHOD AND APPARATUS FOR IOT CLOUD SECURITY

CROSS-REFERENCE TO RELATED APPLICATIONS

This application claims priority to Korean Patent Application No. 10-2023-0154859, filed on Nov. 9, 2023, with the Korean Intellectual Property Office (KIPO), the entire contents of which are hereby incorporated by reference.

BACKGROUND

1. Technical Field

This disclosure relates to an information protection technology based on software-defined perimeter (SDP) for securing Internet of Things (IoT) cloud, and more particularly, to a method and apparatus for protecting information from potential attacks by extending SDP in such a way as to separate access control and data communication through authentication and encryption without exposing the protection target to the outside.

2. Related Art

Traditional software-defined perimeter (SDP) involves the onboarding process for adding a new single packet authorization (SPA) client to the SDP environment and an access process for transmitting messages between objects, utilizing the transport layer security (TLS) handshake during the access and protecting the messages transmitted between objects through asymmetric key encryption.

The SPA client sends a preconfigured single packet to open a closed port from outside the firewall before establishing a mutual trust session, thereby thwarting brute-force and replay attacks. In this case, the SPA message format may vary depending on the SDP implementation, but it is crucial for the packet sender and receiver to share a share secret and a trusted secure channel.

Meanwhile, lightweight handshake protocols designed for establishing secure sessions between devices in resource-constrained environments ensure a smaller message size than the TLS handshake. On the other hand, applying the TLS handshake in SDP still poses challenges for low-performance or low-specification devices.

Thus, there is a growing demand for effective security measures for small devices representing Internet of small things and low-computing power devices in use for IoT.

In particular, as the IoT cloud market expands, there is an increasing demand for lightweight SDP solutions that facilitate flexible security boundary establishment, regardless of the location of protected resources, and provide protection against network-based attacks.

SUMMARY

This disclosure is conceived to solve the above problems and it is an object of this disclosure to provide an SDP-based information protection method and apparatus for IoT cloud security that is capable of improving resource utilization efficiency of SDP solutions by employing an ephemeral Diffie-Hellman over COSE (EDHOC) protocol lighter than the TLS handshake.

It is another object of this disclosure to provide an SDP-based information protection method and apparatus that is capable of enabling flexible authentication security across diverse environments through the scalability of SDP configuration by using both TLS-based SDP and EDHOC-based SDP together, while maintaining compatibility with existing technologies.

According to a first exemplary embodiment of the present disclosure, an information protection method based on software-defined perimeter (SDP) for Internet of Things (IoT) cloud security may comprise: receiving, at an SDP controller, an onboarding request message with an identity (ID) token from an SDP client acting as an initiating host, the onboarding request message comprising information requesting authentication of the SDP client and a handshake parameter specifying a handshake protocol for use in an SDP access process; and issuing, at the SDP controller, an SDP client credential corresponding to the handshake parameter.

The method may further comprise: transmitting the SDP client credential to the SDP client; and receiving a response of the receipt of the SDP credential from the SDP client.

The handshake parameter may include a handshake parameter value designating one of a TLS handshake protocol, a EDHOC handshake protocol, and an extended EDHOC handshake protocol.

The method may further comprise using the TLS handshake protocol by default, when a handshake protocol is not designated by the handshake parameter.

The SDP client credential may comprise a handshake encryption key, a handshake certificate, a single packet authentication (SPA) encryption key, and a hash-based message authentication code (HMAC).

The method may further comprise including a Diffie-Hellman (DH) share secret for generating a DH private key in the SDP client credential.

The method may further comprise: receiving a single packet authentication (SPA) packet from the SDP client; establishing an open transmission control protocol (TCP) connection between the SDP controller and the SDP client based on the SPA packet; and receiving a first ephemeral Diffie-Hellman over COSE (EDHOC) message from the SDP client.

The receiving of the SPA packet and the receiving of the first EDHOC message may comprise receiving the SPA packet in which the first EDHOC message is included.

The SPA packet may comprise an Internet protocol (TP) header, a TCP header, and TCP payload. The TCP payload includes SPA message and EDHOC message.

The method may further comprise encrypting security-sensitive elements among the data elements of the first EDHOC message.

The method may further comprise: omitting redundant data elements overlappeded with data elements of an SPA message of the SPA packet from data elements of the first EDHOC message, and generating the SPA packet by combining the SPA message and the first EDHOC message.

The method may further comprise: verifying the SPA packet; processing EDHOC handshake according to the first EDHOC message based on the SPA packet being verified; and establishing a secure session between the SDP client and the SDP controller based on the EDHOC handshake being processed.

The method may further comprise: receiving a login request message including the SDP client credential from the SDP client after the establishment of the secure session; and verifying the active state of the SDP client based on the login request message.

The method may further comprise: sending an initiating host service message to the SDP client; and sending an initiating host authenticated message to another SDP client, acting as an accepting host.

According to a second exemplary embodiment of the present disclosure, an information protection apparatus based on software-defined perimeter (SDP) for Internet of Things (IoT) cloud security may comprise: an instruction stored in a memory or storage device; and a processor mounted in an SDP controller and configured to execute the instruction, wherein the processor performs operations of: receiving an onboarding request message with an identity (ID) token from an SDP client operating as an initiating host, the onboarding request message comprising information requesting authentication of the SDP client and a handshake parameter specifying a handshake protocol for use in an SDP access process, and issuing an SDP client credential corresponding to the handshake parameter.

The handshake parameter may comprise a handshake parameter value designating one of a TLS handshake protocol, a EDHOC handshake protocol, and an extended EDHOC handshake protocol.

The processor may be configured to perform further operations of receiving a single packet authentication (SPA) packet from the SDP client, establishing an open transmission control protocol (TCP) connection between the SDP controller and the SDP client based on the SPA packet, and receiving a first ephemeral Diffie-Hellman over COSE (EDHOC) message from the SDP client.

The processor may be configured to perform further an operation of receiving the SPA packet and the first EDHOC message in the form of the SPA packet in which the first EDHOC message is coupled or is combined.

The SPA packet may comprise an Internet protocol (IP) header, a TCP header, and TCP payload. The TCP payload includes SPA message and EDHOC message.

The processor may be configured to perform further an operation of generating the SPA packet by omitting redundant data elements overlappeded with data elements of an SPA message of the SPA packet from data elements of the first EDHOC message, and by combining the SPA message and the first EDHOC message.

According to this disclosure, it is advantageous to streamline the SDP security configuration, reduce network bandwidth, and decrease memory usage, without compromising security efficiency for IoT devices, by using the EDHOC protocol that is lighter than the TLS protocol.

According to this disclosure, it is advantageous to ensure scalability of handshake protocols for SDP environment configuration in IoT cloud security. That is, it is possible to provide a workflow that allows for the selection of a separate handshake protocol (i.e., EDHOC protocol) while maintaining the existing SDP environment configuration feature (i.e., TLS handshake) in IoT cloud security. It is also possible to provide a workflow that allows for the selection of a lightweight EDHOC protocol as a separate handshake protocol while ensuring security at the level of the existing TLS, e.g., TLS 1.3 In this case, it is possible to provide scalability of SDP environment configuration while maintaining compatibility with existing technologies, enabling the implementation of authentication security that operates flexibly across various IoT environments.

DETAILED DESCRIPTION OF THE EMBODIMENTS

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
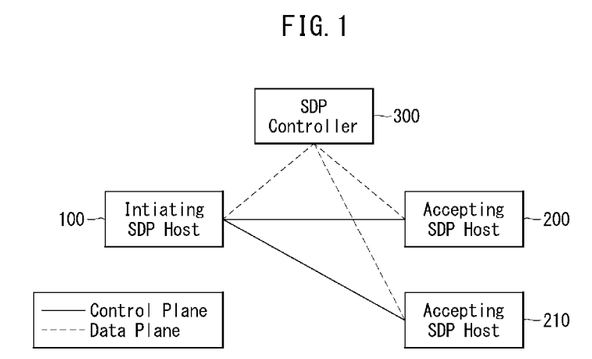
FIG. 1 is a schematic diagram illustrating an SDP architecture to which an information protection method according to an embodiment of the disclosure is applicable.

FIG. 1 is a schematic diagram illustrating an SDP architecture to which an information protection method according to an embodiment of the disclosure is applicable.

SDP is an information protection method that prevents potential attacks through authentication and encryption without exposing the protection target to the outside. SDP is used to secure networks by minimizing the risk of vulnerabilities and sensitive information theft by attackers. SDP is a zero-trust security architecture that blocks all network access requests by default and grants resource access permission based on user authentication and authorization according to their privileges when accessing the network. This type of SDP can overcome the limitations of traditional centralized security methods, in which Internet protocol (IP) ports are exposed to all users, and can enhance network performance by providing a direct connection between users and service providers.

With reference to FIG. 1, the SDP architecture may include a first SDP host 100, second SDP hosts 200 and 210, and an SDP controller 300. The second SDP host 200 may represent one of a plurality of second SDP hosts and share the same configuration and functionality as the other second SDP hosts.

The first SDP host 100 may be the initiating host (IH), which is an SDP client that initiates the process of accessing a protected resource through an accepting host AH. The first SDP host may be referred to as an initiating SDP host.

The second SDP host 200 may be an accepting host (AH), which is an SDP client that blocks all network access by default and allows access from initiating hosts that have received control information and access instructions from the SDP controller 300. The second SDP host 200 may be referred to as an accepting SDP host.

The initiating host and the accepting host are SDP clients that handle communication requests and permissions, and the SDP controller 300 may manage authentication and access rights among SDP clients.

The objects of the SDP solutions included in the aforementioned SDP architecture may employ the Transport Layer Security (TLS) handshake for mutual authentication and key exchange for communication security.

Figure 2:
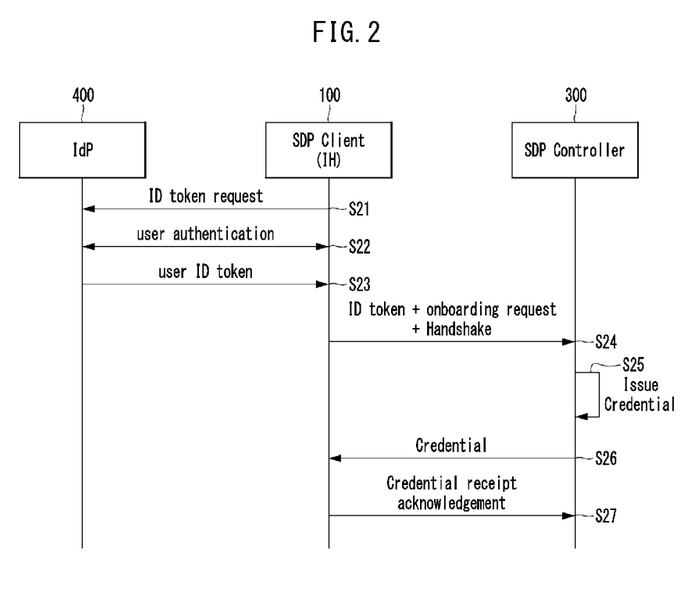
FIG. 2 is a signal flow diagram illustrating an onboarding process for an information protection method according to an embodiment of the disclosure.

FIG. 2 is a signal flow diagram illustrating an onboarding process for an information protection method according to an embodiment of the disclosure.

The onboarding process of SDP is a procedure for adding a new SPA client to the SDP environment, and the messages transmitted between the objects may be protected through asymmetric key encryption. The SPA client may include both an initiating host and an accepting host, similar to the SDP client.

The onboarding process in SDP utilizing the TLS handshake is described in more detail with reference to FIG. 2 hereinafter.

First, the identity provider (IdP) 400 may exchange information and data with the SDP client 100, acting as the initiating host (IH). In the case, the SDP client 100 may request an ID token from the identity provider 400 at step S21 and receive the ID token at step S230 through user authentication with the identity provider 400 at step S23.

Next, the SDP client 100 may request SDP client authentication with the SDP controller 300 using the ID token. That is, the SDP client 100 may send an onboarding request message to the SDP controller 300 while transmitting the ID token. Along with the ID token, the SDP client 100 may send handshake parameters specifying the type of handshake protocol for the access process to the SDP controller 300.

Examples of the handshake parameters specifying the type of handshake protocol are provided in Table 1.

TABLE 1

| Handshake parameter value | SDP handshake protocol |
| --- | --- |
| 1 | (D)TLS handshake protocol |
| 2 | EDHOC handshake protocol |
| 3 | Extended EDHOC handshake protocol |

When the handshake parameters are not specified, the SDP controller 300 may be configured to use the TLS handshake by default.

The SDP controller 300 may issue a new SDP client credential appropriate for the specified handshake protocol at step S25 and send the newly issued credential to the SDP client 100 at step S26. That is, the SDP client 100 may receive the SDP client credential from the SDP controller 300 at step S26 and a response the receipt of the credential to the SDP controller 300 at step S27.

The SDP client credential may include a handshake encryption key, a handshake certificate, an SPA encryption key, and a SPA hash-based message authentication code (HMAC) key. HMAC is a cryptographic message authentication protocol specialized in verifying the identity of the requester and the integrity of the requested message within an application programing interface (API) server through a specific hash string.

In addition, the SDP controller 300 may use the EDHOC specified in the handshake parameters during the onboarding process of SDP using the TLS handshake. In particular, the SDP controller 300 may include a DH share secret for Diffie-Hellman (DH) private key generation in the credential and transmit the credential to the SDP client 100 (refer to step S26).

Here, EDHOC is a very small and lightweight authenticated Diffie-Hellman key exchange protocol using ephemeral keys and it may provide mutual authentication, forward secrecy, and identity protection in limited scenarios. EDHOC can keep the additional code size very small by reusing CBOR object signing and encryption (COSE) for encryption, concise binary object representation (CBOR) for encoding, and the constrained application protocol (CoAP) for transmission.

CBOR is a binary data serialization format based on JSON, and it can be used to transmit data objects containing name-value pairs more concisely, similar to JSON. CBOR may also serve as a recommended data serialization layer for specialized IoT protocol suites like CoAP and as the underlying data format for COSE messages.

According to this embodiment, it is possible to configure a lightweight authentication security protocol and workflow to replace the TLS handshake in the SDP solution. That is, it is possible to provide a workflow that uses the EDHOC protocol as a lightweight authentication security protocol to replace the TLS handshake.

Figure 3:
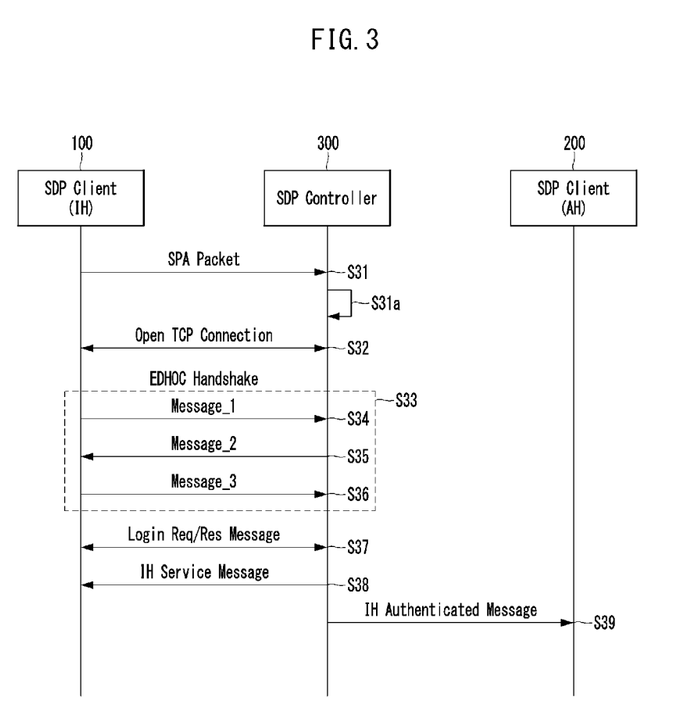
FIG. 3 is a signal flow diagram illustrating an access process for an information protection method according to an embodiment of the disclosure.

FIG. 3 is a signal flow diagram illustrating an access process for an information protection method according to an embodiment of the disclosure.

The access process of this embodiment is an SDP access process for using an optional handshake, and this process may be executed after the onboarding process described above with reference to FIG. 2. In particular, the access process of this embodiment uses the EDHOC handshake. That is, the EDHOC handshake is used instead of the TLS handshake in the SDP environment configuration process. Assuming the use of the same algorithm, the EDHOC handshake allows for efficient security session establishment with smaller message sizes compared to the TLS handshake or the datagram transmission layer security (DTLS) handshake.

With reference to FIG. 3, the initiating host, which is the SDP client 100, may transmit an SPA packet to the SDP controller 300 at step S31. The SDP controller 300 may receive the SPA packet from the SDP client 100 and verify the received SPA packet at step S31a.

Once the SPA packet is verified, the SDP client 100 and the SDP controller 300 may establish an open transmission control protocol (TCP) connection with each other at S32.

Next, the SDP client 100 may send a first message (message_1) to the SDP controller 300 at step S34 as part of the EDHOC handshake process S33. The first message may be an EDHOC message. The first message may be referred to as the first EDHOC message.

Next, once the SPA packet is verified, the SDP controller 300 may process the EDHOC handshake according to the first message, establish a secure session with the SDP client 100, and then send the associated second message (message_2) to the SDP client 100 at S35. Next, the SDP controller 300 may receive a third message (message_3) from the SDP client 100 in response to the second message (message_2) at S36.

After the secure session is established, the SDP client 100, acting as the initiating host, may send a login request message containing a credential to notify the SDP controller 300 of its active status and may receive, in response to the login request, a login response message from the SDP controller 300 at S37.

Next, the SDP controller 300 may send an IH service message to the SDP client 100, acting as the initiating host (IH), at S38 and send an IH authenticated message to the SDP client 200, acting as the accepting host (AH), at S39.

The IH service message may be used to provide the initiating host (IH) with the IP address of the accepting host (AH) and a list of available services. The IH authenticated message may be used to relay the access permission request from the initiating host (IH) to the accepting host (AH).

Figure 4:
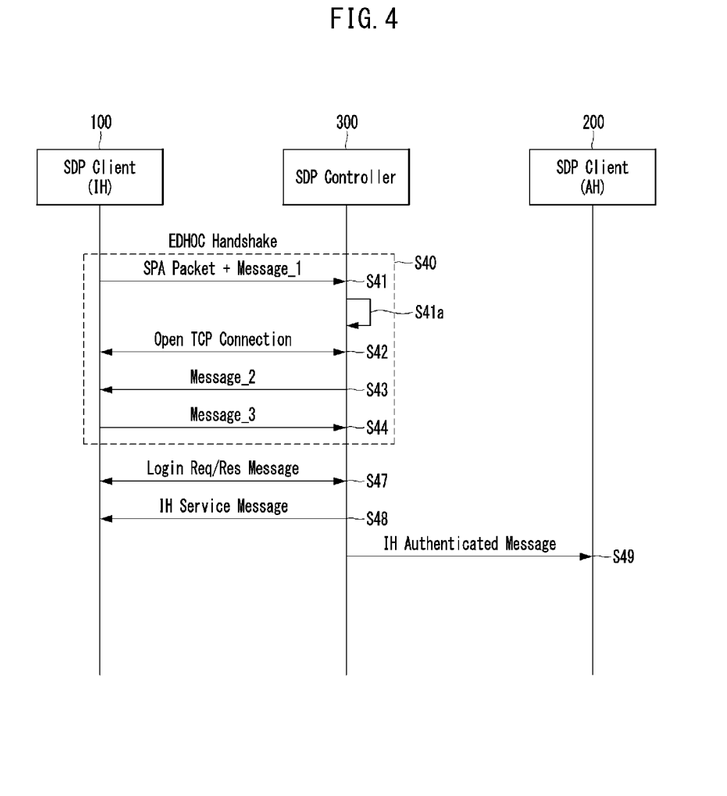
FIG. 4 is a signal flow diagram illustrating an access process for an information protection method according to another embodiment of the disclosure.

FIG. 4 is a signal flow diagram illustrating an access process for an information protection method according to another embodiment of the disclosure.

The access process of this embodiment is an SDP access process for using an optional handshake, and this process may be executed after the onboarding process described above with reference to FIG. 2. The access process of this embodiment uses the extended EDHOC handshake. That is, by using the EDHOC handshake instead of the TLS handshake in the SDP environment configuration process, and particularly, combining the SPA packet and the first EDHOC message (Message_1) in use for EDHOC handshake during the SDP access process, it is possible to minimize latency and message size, ensuring efficiency.

With reference to FIG. 4, the SDP client 100, acting as the initiating host, may send the SPA packet combined with the EDHOC message to the SDP controller 300 during the EDHOC handshake process S40. That is, the SDP client 100 may send the SPA packet combined with the first message (message_1) as the EDHOC message to the SDP controller 300 at step S41. The SDP controller 300 may receive the SPA packet combined with the first message (message_1) from the SDP client 100 and verify the received SPA packet at step S41a.

Once the SPA packet is verified successfully, the SDP controller 300 may establish a TCP connection with the SDP client 100 at step S42.

Next, the SDP controller 300 may process the EDHOC handshake according to the first message, establish a secure session between with the SDP client 100, and send a second message (message_2) to the SDP client 100 at step S43 in response to the SPA packet combined with the first message. Next, the SDP controller 300 may receive a third message (message_3) from the SDP client 100 at step S44 in response to the second message.

After the secure session is established, the SDP client 100, acting as the initiating host, may send a login request message containing a credential to notify the SDP controller 300 of its active status and may receive, in response to the login request, a login response message from the SDP controller 300 at S47.

Next, the SDP controller 300 may send an IH service message to the SDP client 100, acting as the initiating host (IH), at S48 and send an IH authenticated message to the SDP client 200, acting as the accepting host (AH), at S49.

Figure 5:
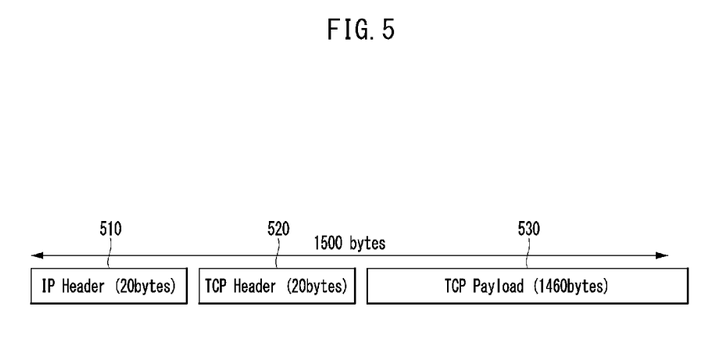
FIG. 5 is a diagram illustrating an SPA message format for extended EDHOC handshake applicable to the information protection method of FIG. 4.

FIG. 5 is a diagram illustrating an SPA message format for extended EDHOC handshake applicable to the information protection method of FIG. 4.

With reference to FIG. 5, the message format of the SPA message combined with the first message (EDHOC message) for the extended EDHOC handshake may include an IP header 510, a TCP header 520, and TCP payload 530. The IP header 510, TCP header 520, and the TCP payload 530 may be 20 bytes, 20 bytes, and 1460 bytes, respectively.

In the information protection method of this embodiment, the first EDHOC message may be simply combined with the general SPA message format, but without limited thereto, specific data elements of the first EDHOC message may replace and omit redundant data elements of the SPA message.

Table 2 shows the typical SPA message format.

TABLE 2

| Field | Description | Size [Bytes] |
| --- | --- | --- |
| ClientID | Identifier (allocated to user device) | 4 |
| Nonce | SPA packet reuse (replay attacks) prevention data field | 2 |

TABLE 2-continued

| Field | Description | Size [Bytes] |
| --- | --- | --- |
| Timestamp | Expiration time (prevention of old SPA packet service) | 4 |
| Source IP Address | Public IH/AH IP address (prevention of IP address spoofing in packet header) | 4 |
| HOTP | Hashed one-time password (for SPA packet integrity/authentication) | 4 |
| Message Type | Message type (expected from IH after connection establishment) (op) | — |
| Message String | Field used to specify service requested by IH (op) | — |
| HMAC | For message integrity verification Value obtained by hashing all parameters of SPA packet | 64 |

HOTP (HMAC-based one-time password) may refer to the algorithm of HMAC-based hashed one-time password. HMAC represents the hash-based message authentication code. The message type and message string fields may be used optionally (op).

Table 3 shows the first EDHOC message format applicable to the information protection method of this embodiment.

TABLE 3

| Field | Description | Size [Bytes] |
| --- | --- | --- |
| METHOD | Specify static Diffie-Hellman and signature key authentication method | 1 |
| SUITES_I | List of sender's preferred encryption algorithms | 9 |
| G_X | Temporary public key generated through scalar multiplication of share secret and random number generated by sender | 34 |
| C_I | Connection identifier for identification of connection of EDHOC session | 1 |
| EAD_1 | CBOR sequence (op) representing external authentication data or padding | — |

According to this embodiment, it is possible to minimize network latency required for object authentication and key exchange by combining the SPA packet with the first EDHOC message.

According to this embodiment, it is also possible to provide encryption for the security-required elements among the data elements of the first EDHOC message transmitted in plaintext. For example, the SPA packet may be encrypted with the exchanged SPA encryption key during the onboarding process.

In this embodiment, it is also possible to improve the security level by including and encrypting the key material of the ephemeral public key (G_X) used to generate the application key in the SPA packet. The ephemeral public key (G_X) may be derived by performing scalar multiplication of a certain number of bits (e.g., 16 bits) of random data generated by the SDP client with the share secret (G) shared between the SDP client and the SDP controller. Since the ephemeral public key (G_X) is generated based on random data, it is possible to prevent replay attacks.

Table 4 shows the extended SPA message format for this extended EDHOC handshake (hereinafter referred to as 'extended SPA message format').

TABLE 4

| Field | Description | Size [Bytes] |
| --- | --- | --- |
| ClientID | Identifier (allocated to user device) | 4 |
| G_X | Temporary public key generated through scalar multiplication of share secret and random number generated by sender | 34 |
| Timestamp | Expiration time (prevention of old SPA packet service) | 4 |
| Source IP Address | Public IH/AH IP address (prevention of IP address spoofing in packet header) | 4 |
| HOTP | Hashed one-time password (for SPA packet integrity/authentication) | 4 |
| Message Type | Message type (expected from IH after connection establishment) | — |
| Message String | Field used to specify service requested by IH | — |
| HMAC | For message integrity verification value obtained by hashing all parameters of SPA packet | 64 |

The extended SPA message format in Table 4 does not include a nonce field, which is a data field used to prevent SPA packet reuse or replay attacks. That is, the extended SPA message format may omit the nonce and include and encrypt the public key material of the G_X field from the first EDHOC message format instead of the nonce to improve the security level.

As such, according to this embodiment, it is possible to reduce network bandwidth and save memory usage by allowing the SDP client to omit redundant data elements from the data elements from the SPA packet and the first EDHOC message and even improve security performance by substituting or combining predetermined fields.

Table 5 shows the first EDHOC message format applicable to the information protection method of this embodiment.

TABLE 5

| field | Description | | |
| --- | --- | --- | --- |
| SPA | Single packet encrypted with SPA encryption key | ClientID | Client identifier |
| | | G_X | Temporary public key generated through scalar multiplication of share secret and random number generated by sender |
| | | Timestamp | Expiration time |
| | | Source IP Address | Public IP address of IH/AH |
| | | HOTP | Hashed one-time password |
| | | Message Type | Expected message type notification |
| | | Message String | Specify requested service |
| | | HMAC | Value obtained by hashing all parameters of SPA packet |
| METHOD | Specify static Diffie-Hellman and signature key authentication method | | |
| SUITES_I | List of sender's preferred encryption algorithms | | |
| C_I | Connection identifier for identification of connection of EDHOC session | | |
| EAD_1 | Optional CBOR sequence representing external authentication data or padding | | |

According to the embodiments described above, it is possible to design a handshake protocol for SDP environment configuration, supporting three versions of TLS, EDHOC, and extended EDHOC. It is also possible to provide configuration of handshake parameters, allowing the SDP client to selectively use the desired handshake protocol.

Furthermore, it is possible to minimize network latency and reduce memory usage by combining the SPA packet and first EDHOC message.

Figure 6:
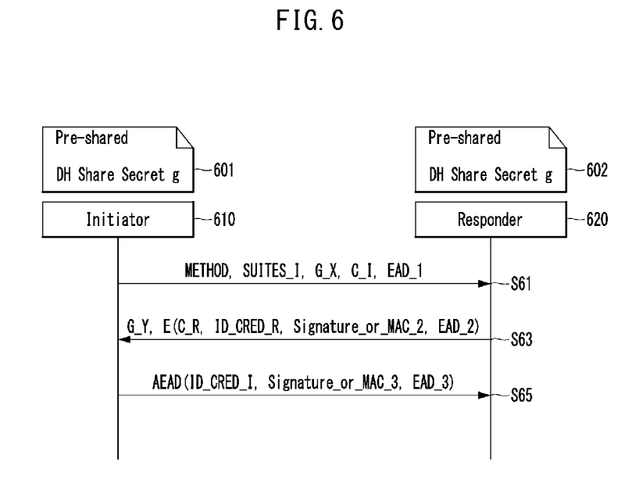
FIG. 6 is a signal flow diagram illustrating the EDHOC protocol applicable to the information protection method of FIG. 4.

FIG. 6 is a signal flow diagram illustrating the EDHOC protocol applicable to the information protection method of FIG. 4.

With reference to FIG. 6, the EDHOC protocol is a lightweight handshake protocol designed for establishing secure sessions between devices in resource-constrained environments. The EDHOC protocol may be executed through message exchanges between an initiator 610 and a responder 620. The initiator 610 may include a pre-shared DH share secret g 601, and similarly, the responder 620 may include a pre-shared DH share secret g 602.

First, the initiator 610 may send the responder 620 a first EDHOC message including fields related to the method (METHOD), encryption algorithm list (SUITES_I), ephemeral public key (G_X), connection identifier (C_I), and padding (EAD_1) at step S61. That is, the initiator 610 may send the authentication method, encryption algorithm list, and DH private key to the responder 620.

Here, the method (METHOD) is a field specifying the static Diffie-Hellman and signature key authentication method. The encryption algorithm list (SUITES_I) is a field representing the list of encryption algorithms preferred by the sender or initiator 610. The ephemeral public key (G_X) is a key generated through scalar multiplication of the share secret 601 and a 16-bit random number generated by the initiator. The connection identifier (C_I) is an identifier that identifies the connection of the EDHOC session. The padding (EAD_1) is a field that represents external authentication data. The padding may optionally have a CBOR sequence.

Next, the responder 620 may encrypt the second EDHOC message including fields related to the ephemeral public key (G_Y) generated through scalar multiplication of the shared secret 602 and the 16-bit random number generated by the responder, the connection identifier (C_R), the credential identifier (ID_CRED_R), the electronic signature (signature) or message authentication code (MAC_2), and the padding (EAD_2), and send the second EDHOC message to the initiator 610 at step S63.

That is, the responder 620 may generate a DH private key and derive a DH share key for generating encryption keys. The responder 620 may send the DH private key in plaintext to the initiator 610 to derive the DH share key. In addition, the responder 620 may encrypt the credential and electronic signature for user authentication and integrity assurance and send them to the initiator 610.

Next, the initiator 610 may derive the DH share key from the DH private key received in plaintext from the responder 620, perform message decryption and authentication, generate a session key using the DH share key, encrypt a third EDHOC message including fields related to user authentication and integrity assurance such as credential (ID_CRED_I), electronic signature (signature), or message authentication code (MAC_3), and padding (EAD_3), and send the encrypted message to the responder 620.

Through the above process, the sensors or security devices belonging to the IoT cloud may perform the EDHOC handshake and terminate the protocol. In particular, the information protection apparatus according to an alternative embodiment may be configured to combine the ephemeral public key (G_X) from the first EDHOC message into the SPA message. In this case, the ephemeral public key (G_X) field may be omitted from the first EDHOC message.

Figure 7:
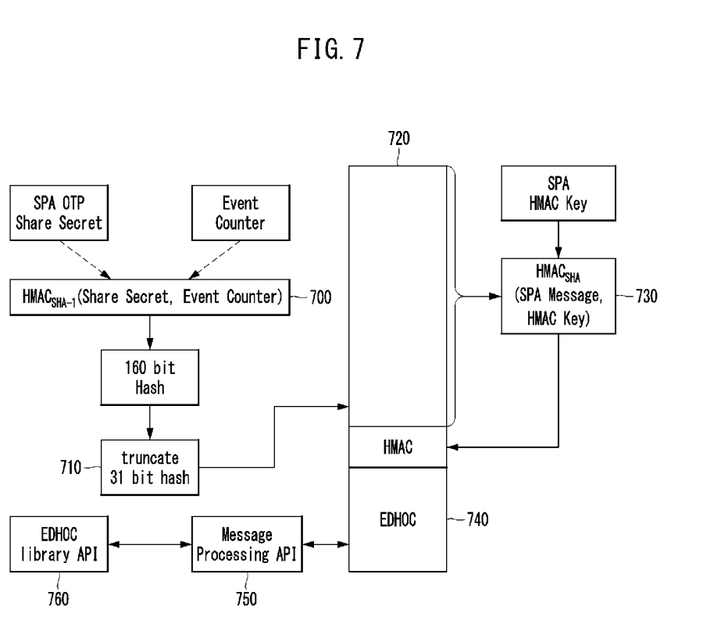
FIG. 7 is a block diagram illustrating an SPA message processing procedure applicable to the information protection method of FIG. 4.

FIG. 7 is a block diagram illustrating an SPA message processing procedure applicable to the information protection method of FIG. 4.

SPA refers to the method of sending a preconfigured single packet to a closed port before the establishment of a mutual trust session to open the port from outside the firewall. By using SPA, it is possible to prevent brute-force attacks and replay attacks on communication nodes such as sensors or low-power devices belonging to the IoT cloud.

The SPA message format may vary depending on the SDP implementation method, but it is essential that the packet sender and receiver share a share secret and a trusted secure channel.

A computing system having ab SDP controller operating the SPA operation procedure may include a first SPA operator 700, a unit 710, a second SPA operator 730, a message processing API 750, and an EDHOC library API 760.

With reference to FIG. 7, in the SPA operation procedure, the first SPA operator 700 having an SPA HOTP operation function receives signals of SPA OTP share secret and event counter, and generates a 160-bit hash through first HMAC calculation, and then generate a 31-bit hash via the unit 710 with a truncation function. The 31-bit hash may be recorded in the Hashed One-Time Password (HOTP) field of the SPA message format 720.

The second SPA operator 730 having an SPA HMAC operation function may obtain an HMAC value by performing hash operations on all parameters of data, numerical identifier, validity period, IP address, hashed one-time password, information indicating the message type, and information specifying the service requested by the IH, which are from the fields excluding the SPA HMAC key and HMAC field of the SPA message format, and record the HMAC value in the HMAC field of the SPA message format 720.

In this embodiment, the SPA message may take the form combined with the first EDHOC message 740. In this case, the first EDHOC message 740 may be combined with the SPA message format 720 by the message processing API 750 that interfaces with the EDHOC library API 760. The details of the message format of the SPA message 720 may be referred to in Table 2.

Figure 8:
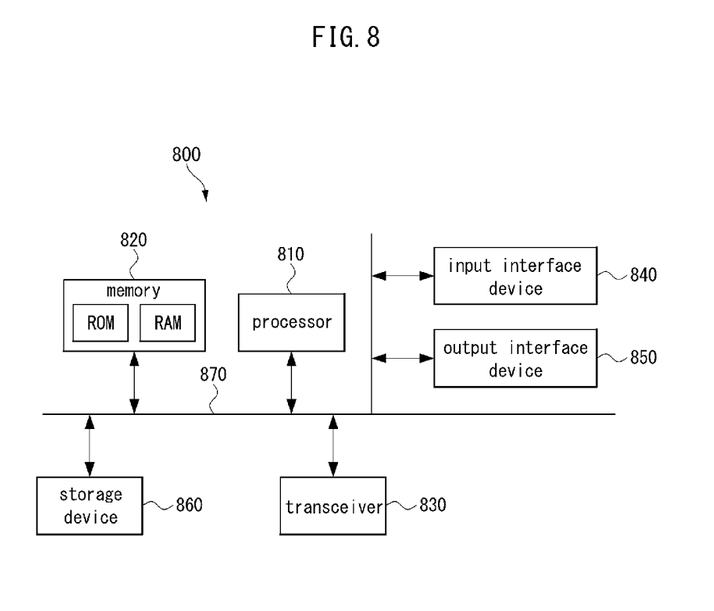
FIG. 8 is a schematic block diagram illustrating an information protection apparatus according to another embodiment of the disclosure.

FIG. 8 is a schematic block diagram illustrating an information protection apparatus according to another embodiment of the disclosure.

With reference to FIG. 8, the information protection apparatus 800 may include low-power computing devices or communication nodes belonging to the IoT cloud. The information protection apparatus 800 may further include a processor 810, a memory 820, a transceiver 830, an input interface device 840, an output interface device 850, a storage device 860, or any combinations thereof. The components included in the information protection apparatus 800 can communicate with each other through a bus 870.

The components included in the information protection apparatus 800 may be connected through individual interfaces or individual buses centered around the processor 810, as opposed to being connected through the common bus 870. For example, the processor 810 may be connected to at least one of the memory 820, the transceiver 830, the input interface device 840, the output interface device 850, and the storage device 860 through a dedicated interface.

The processor 810 may include the aforementioned first SPA operator, second SPA operator, and message processing API. Such a processor may refer to a central processing unit (CPU), a graphics processing unit (GPU), or a dedicated processor performing methods according to the embodiments of the present invention.

Each of the memory 820 and the storage device 860 may be configured as at least one of a volatile storage medium and a non-volatile storage medium. For example, the memory 820 may be configured as at least one of read-only memory (ROM) and random access memory (RAM).

The transceiver 830 may include at least one sub-communication system supporting wireless communication, mobile communication, or satellite communication to send and receive signals and data with other communication nodes or management servers in the IoT cloud over the network. The other communication nodes may include IoT sensors.

Here, the network may include networks that support device-to-device (D2D) communication, sidelink communication, New Radio (NR) communication, and so on. The network may also include any communication network that can be formed between on-board units or devices equipped with on-board units connected via mobile communication networks or wireless communication networks.

The input interface device 840 may include at least one input means selected from a keyboard, microphone, touchpad, touchscreen, remote control means, and an input signal processing unit that maps signals input through at least one input means with stored commands or processes the input signals.

The output interface device 850 may include an output signal processing unit, which maps output signals to stored signal forms or levels or process the signals, and at least one output means which outputs signals or information in the form of vibration, light, sound, or heat according to the signals from the output signal processing unit, under the control of the processor 810. The at least one output means may include at least one selected among output means such as a speaker, a display device, a printer, an optical output device, and a vibration output device.

The processor 810 may execute program commands stored in at least one of the memory 820 and storage device 860 or software modules containing program commands. That is, the processor 810 may be configured to execute the program commands to perform at least one of the embodiments of the above-described information protection method when the processor 810 is executed by the program commands.

According to this embodiment, it is possible to provide a new information protection method employing the EDHOC protocol as a lightweight authentication security protocol instead of the TLS handshake for securing the IoT cloud. With the employment of the EDHOC protocol, it becomes possible to reduce network bandwidth and memory usage due to smaller message sizes compared to the TLS or DTLS protocols, without compromising the security level of the existing TLS 1.3 handshake.

According to this embodiment, it is possible to provide an extended handshake protocol workflow for the SDP environment configuration. That is, by adding handshake parameters that allow the SDP client to specify the handshake option to be used during the SDP onboarding process, it becomes possible to implement efficient security authentication in various IoT environments and enhance the flexibility of the SDP solution. Furthermore, by defining a new message format to combine the transmission processes of SPA messages and the first EDHOC message, it is possible to reduce memory usage by omitting redundant data elements between the two messages and minimize network latency by streamlining the necessary procedures for object authentication and application encryption key sharing into a single round trip time (RTT).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An information protection method based on software-defined perimeter (SDP) for Internet of Things (IoT) cloud security, the method comprising:
receiving, by an SDP controller, an onboarding request message with an identity (ID) token from an SDP client operating as an initiating host, the onboarding request message comprising information requesting authentication of the SDP client and a handshake parameter specifying a handshake protocol for use in an SDP access process;
issuing, by the SDP controller, an SDP client credential corresponding to the handshake parameter, wherein the handshake parameter includes a handshake parameter value indicating one protocol selected from a plurality of protocols including a transport layer security (TLS) handshake protocol, an ephemeral Diffie-Hellman over concise binary object representation (CBOR) object signing and encryption (COSE) (EDHOC) handshake protocol, and an extended EDHOC handshake protocol;

receiving a single packet authentication (SPA) packet from the SDP client;

establishing an open transmission control protocol (TCP) connection between the SDP controller and the SDP client based on the SPA packet; and receiving a first EDHOC message from the SDP client.

2. The method of claim 1, further comprising:

transmitting the SDP client credential to the SDP client; and receiving a response of the receipt of the SDP credential from the SDP client.

3. The method of claim 1, further comprising using the TLS handshake protocol by default, when a handshake protocol is not designated by the handshake parameter.

4. The method of claim 1, wherein the SDP client credential comprises a handshake encryption key, a handshake certificate, a single packet authentication (SPA) encryption key, and a hash-based message authentication code (HMAC).

5. The method of claim 1, further comprising including a Diffie-Hellman (DH) share secret for generating a DH private key in the SDP client credential.

6. The method of claim 1, wherein the receiving of the SPA packet and the receiving of the first EDHOC message comprises receiving the SPA packet in which the first EDHOC message is included.

7. The method of claim 6, wherein the SPA packet comprises an Internet protocol (IP) header, a TCP header, and TCP payload, the TCP payload including SPA and EDHOC messages.

8. The method of claim 6, further comprising encrypting security-sensitive elements among the data elements of the first EDHOC message.

9. The method of claim 6, further comprising:

omitting redundant data elements overlapped with data elements of an SPA message of the SPA packet from data elements of the first EDHOC message; and combining the SPA message and the first EDHOC message.

10. The method of claim 6, further comprising:

verifying the SPA packet;

processing EDHOC handshake according to the first EDHOC message based on the SPA packet being verified; and establishing a secure session between the SDP client and the SDP controller based on the EDHOC handshake being processed.

11. The method of claim 10, further comprising:

receiving a login request message including the SDP client credential from the SDP client after the establishment of the secure session; and verifying the active state of the SDP client based on the login request message.

12. The method of claim 11, further comprising:

sending an initiating host service message to the SDP client; and sending an initiating host authenticated message to another SDP client, acting as an accepting host.

13. An information protection apparatus based on software-defined perimeter (SDP) for Internet of Things (IoT) cloud security, the apparatus comprising:

an instruction stored in a memory or storage device; and a processor mounted in an SDP controller and configured to execute the instruction, wherein the processor performs operations of:

receiving an onboarding request message with an identity (ID) token from an SDP client acting as an initiating host, the onboarding request message comprising information requesting authentication of the SDP client and a handshake parameter specifying a handshake protocol for use in an SDP access process;

issuing an SDP client credential corresponding to the handshake parameter, wherein the handshake parameter includes a handshake parameter value indicating one protocol selected from a plurality of protocols including a transport layer security (TLS) handshake protocol, an ephemeral Diffie-Hellman over concise binary object representation (CBOR) object signing and encryption (COSE) (EDHOC) handshake protocol, and an extended EDHOC handshake protocol; and receiving, by the processor, a single packet authentication (SPA) packet from the SDP client, establishing an open transmission control protocol (TCP) connection between the SDP controller and the SDP client based on the SPA packet, and receiving a first EDHOC message from the SDP client.

14. The apparatus of claim 13, further comprising receiving, by the processor, the SPA packet and the first EDHOC message in the form of the SPA packet in which the first EDHOC message is coupled.

15. The apparatus of claim 14, wherein the SPA packet comprises an Internet protocol (IP) header, a TCP header, and TCP payload, the TCP payload including SPA and EDHOC messages.

16. The apparatus of claim 13, further comprising generating, by the processor, the SPA packet by omitting redundant data elements overlapped with data elements of an SPA message of the SPA packet from data elements of the first EDHOC message, and by combining the SPA message and the first EDHOC message.

* * * * *